United States Patent
Yokoo et al.

(10) Patent No.: US 7,401,047 B2
(45) Date of Patent: Jul. 15, 2008

(54) NETWORK AUCTION SCHEME, WINNING BID DETERMINING SCHEME, APPARATUS THEREFOR, AND RECORDING MEDIUM HAVING THEIR PROGRAMS RECORDED THEREON

(75) Inventors: Makoto Yokoo, Nara (JP); Yuko Sakurai, Nara (JP); Shigeo Matsubara, Nara (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1379 days.

(21) Appl. No.: 09/983,934

(22) Filed: Oct. 26, 2001

(65) Prior Publication Data
US 2002/0087458 A1    Jul. 4, 2002

(30) Foreign Application Priority Data
Oct. 30, 2000    (JP) .............................. 2000-330148

(51) Int. Cl.
*G06Q 40/00* (2006.01)
(52) U.S. Cl. ...................................... 705/37; 705/36 R
(58) Field of Classification Search .................. 705/37, 705/36 R
See application file for complete search history.

(56) References Cited

U.S. PATENT DOCUMENTS
2004/0210511 A1* 10/2004 Waelbroeck et al. .......... 705/37

OTHER PUBLICATIONS

Vernon L. Smith "Experimental Methods in the Political Economy of Exchange", Oct. 1986.*
Makoto Yokoo, et al., "Robust Double Auction Protocol Against False-Name Bids", 21st International Conference on Distributed Computing Systems, IEEE Computer Society Technical Committee on Distributed Processing, Apr. 16-19, 2001, pp. 137-145.

* cited by examiner

*Primary Examiner*—Harish T. Dass
(74) *Attorney, Agent, or Firm*—Oblon, Spivak, McClelland, Maier & Neustadt, P.C.

(57) ABSTRACT

To prevent a single bidder from profiting by submitting multiple false-name bids, an auctioneer: sets a threshold price r; determines the ranking i of the minimum value equal to or larger than r in a buyers' evaluation value sequence sorted in decreasing order and the ranking j of the maximum value equal to or smaller than r in a sellers' evaluation value sequence sorted in increasing order; if i=j, allows first to i-th buyers and sellers to trade at the price r; if i>j, allows first to j-th buyers and sellers to trade at a trade price of the (j+1)-th buyer's evaluation value for the buyers and at the threshold price r for the sellers; and if i<j, allows the first to i-th buyers and sellers to trade at the threshold price for the buyers and at a trade price of the (i+1)-th seller's evaluation value.

5 Claims, 6 Drawing Sheets

NETWORK AUCTION SCHEME, WINNING BID DETERMINING SCHEME, APPARATUS THEREFOR, AND RECORDING MEDIUM HAVING THEIR PROGRAMS RECORDED THEREON

BACKGROUND OF THE INVENTION

The present invention relates to a two-sided electronic auction scheme that permits multiple sellers and buyers distributed on a communication network to hold auctions by electronic means, an apparatus for the auction scheme, and a recording medium on which there are recorded programs for implementing the auction scheme.

Two-sided auction schemes, by which multiple sellers and buyers submit their desired selling/purchase prices for a certain kind of goods put on sale and trade, are called double auctions and have been widely used in stock, bond and foreign exchange markets. One of the conventional double auction protocols is a PMD protocol (R. P. AcAfee, "A Dominant Strategy double Auction," Journal of Economic Theory, vol.56, pp.434-450, 1992). The PMD protocol will be described below.

Figure 1:
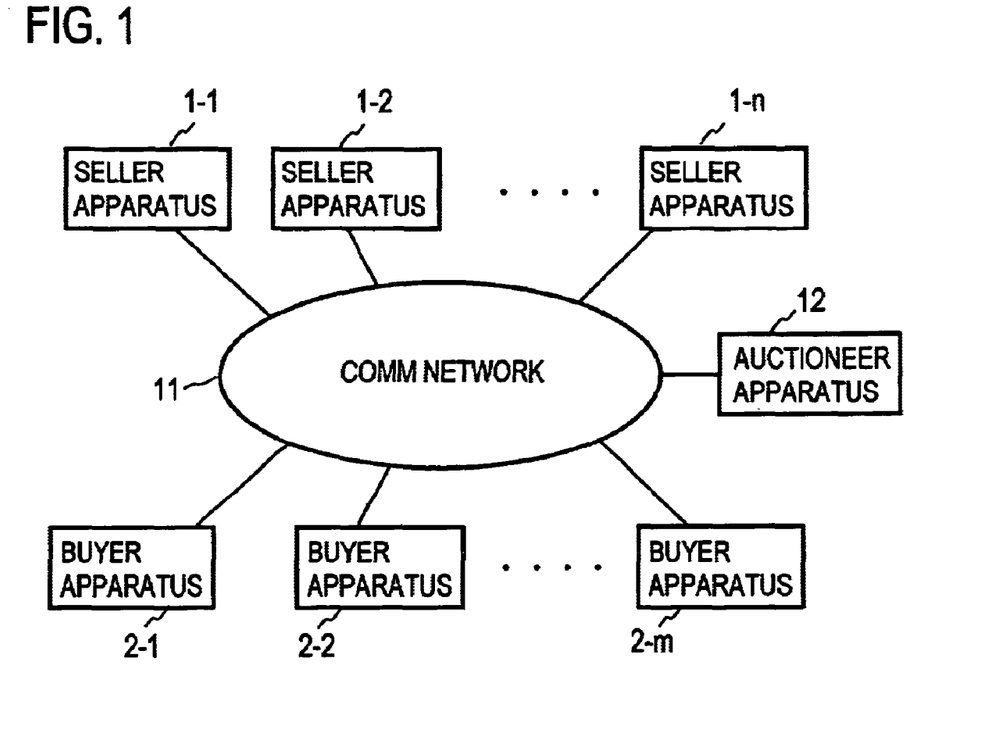
FIG. 1 is a block diagram depicting an example of a conventional electronic auction system to which the present invention is applied.

FIG. 1 is a diagrammatic showing of an electronic double auction system based on the PMD protocol, in which multiple seller apparatuses 1-1, . . . , 1-n and multiple buyer apparatuses 2-1, . . . , 2-m are distributed communication network 11, to which an auctioneer apparatus 12 is connected. That is, assume that m buyers and n sellers are present on the communication network 11. Further, assume that each buyer demands only one unit of a single kind of goods and that each seller possesses one unit of a single kind of goods.

The m buyers use their apparatuses 2-1, . . . , 2-m to send applications for bidding to the auctioneer apparatus 12 together with their evaluation values $b_1, \ldots, b_m$ (which are the highest possible purchase prices, not necessary true), and the n sellers use their apparatuses 1-1, . . . , 1-n to send applications for bidding to the auctioneer apparatus 12 together with their evaluation values $s_1, \ldots, s_n$ (which are the lowest possible selling prices, not necessarily true).

Figure 2:
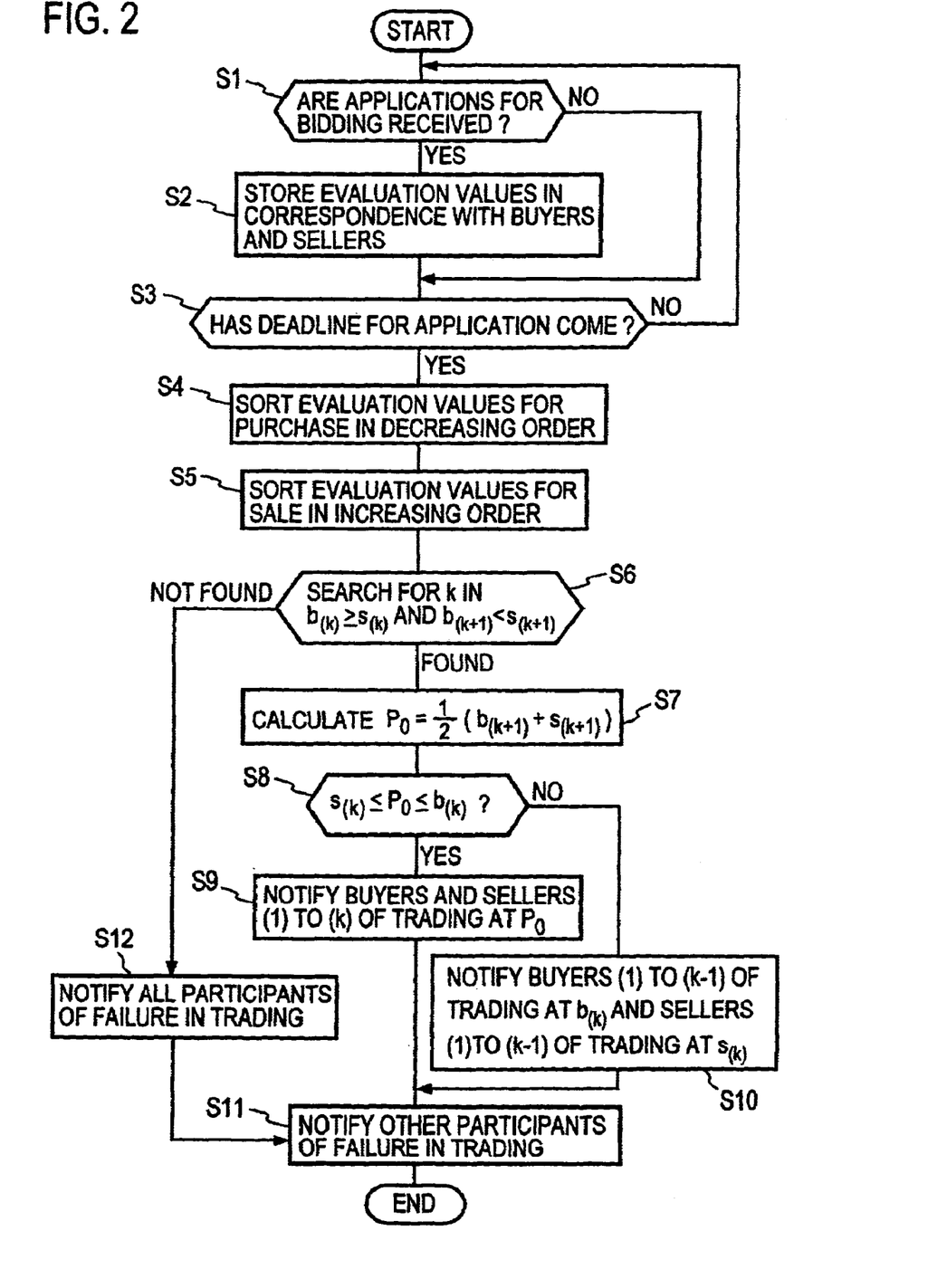
FIG. 2 is a flowchart

As shown in FIG. 2, upon receiving the applications for bidding from the seller apparatuses 1-1, . . . , 1-n and the applications for bidding from the buyer apparatuses 2-1, . . . , 2-m (step S1), the auctioneer apparatus 12: stores the sellers and buyers of the applications received and their evaluation values in a storage part (step S2); makes a check to determine if the deadline for applications has passed (step S3); and if not, returns to step S1 to wait for applications to come. It is predetermined that the term for accepting the applications, for example, runs from a certain time in the morning of a weekday to a certain time in the morning; the sellers and buyers send their applications for bidding to the auctioneer apparatus 12 by the deadline.

Upon expiration of the term for application, the auctioneer apparatus 12 reads out the evaluation values of all the buyers from the storage part and sorts their declared evaluation values $b_1, \ldots, b_m$ in decreasing order $$b_{(1)} \geq b_{(2)} \geq \ldots \geq b_{(m)}$$

(step S4), and reads out the sellers declared evaluation values $s_1, \ldots, s_n$ from the storage part and sort them in increasing order $$s_{(1)} \leq s_{(2)} \leq \ldots \leq s_{(n)}$$

(step S5). In the above, $b_{(i)}$ represents the i-th largest one of the buyers' declared evaluation values and $s_{(i)}$ represents the i-th smallest one of the sellers' declared evaluation values. When multiple evaluation values are equal (in the case of a tiebreak), they are sorted randomly (by lot or the like).

To simplify the protocol description, let $b_{(m+1)}$ represent the smallest possible evaluation value of the buyers (e.g., 0) and $s_{(n+1)}$ represent the largest possible evaluation value of the sellers (e.g., one billion dollars). Further, assume that $b_{(m+1)} < s_{(n+1)}$ holds.

A search is made for k such that $b_{(k)} \geq s_{(k)}$ and $b_{(k+1)} < s_{(k+1)}$ hold (step S6). If this k is found, a maximum of k trades is possible since the first to k-th evaluation values of the buyers are equal to or larger than the evaluation values of the sellers. If the k is not found, the auctioneer notifies every bidder or participant of failure in trading (step S12), and put an end to the current session of auction.

A candidate $p_0$ of the trading price is defined as given below and the price $p_0$ is calculated (step S7).

$$P_0 = (b_{(k+)} + s_{(k+1)})/2$$

The protocol is described as follows.

A check is made to see if $s_{(k)} \leq p_0 \leq b_{(k)}$ holds (step S8).

Case (a): If $s_{(k)} \leq p_0 \leq b_{(k)}$ holds, the first to k-th buyers and sellers trade at the price $p_0$. That is, the auctioneer apparatus 12 sends to each of these buyers' and sellers' apparatuses a notification that the trade will be made at the price $p_0$ (step S9).

Case (b): If $s_{(k)} \leq p_0 \leq b_{(k)}$ does not hold, the first to (k−1)-th buyers and sellers trade. All of the k−1 buyers pay $b_{(k)}$, and the k−1 sellers all receive $s_{(k)}$. The auctioneer apparatus 12 sends to each of the buyers' apparatuses concerned a notification that the trade succeeds at $b_{(k)}$, and to each of the sellers' apparatuses a notification that the trade succeeds at $s_{(k)}$ (step S10).

In either of the cases (a) and (b), the auctioneer notifies unsuccessful buyers and sellers of failure in trading (step S11).

When the condition in step S8 does not hold, that is, in the case of (b), since the price $b_{(k)}$ to be paid by the buyer is equal to or higher than the price $s_{(k)}$ to be received by the seller, the difference $(k-1)(b_{(k)} - s_{(k)})$ is left over. Assume that the auctioneer receives this difference.

It is known in the art that when no false-name bids are submitted, the utility of each bidder can be maximized by bidding a correct evaluation value, i.e. the largest possible evaluation value indicating that the buyer has no intention of paying higher prices, and the smallest possible evaluation value indicating that the seller has no intention of trading at lower prices. This property is called incentive compatibility. When the incentive compatibility holds, electronic auctions can easily be held without the need for hiding the bid value of every bidder from other participants as in ordinary electronic auction schemes.

Electronic auctions using telecommunication systems, typified by the Internet, permit a single bidder to easily submit multiple bids using multiple names (for example, different electronic mail addresses). This is called false-name bidding.

If the false-name bidding is possible, the PMD protocol doe not satisfy the incentive compatibility as described below.

EXAMPLE 1

Assume that evaluation values of buyers/sellers are as follows.

Buyers' evaluation values: 9>8>7>4
Sellers' evaluation values: 2<3<4<5

If each participant truthfully declares his/her evaluation value:

$$b_{(3)}=7>s_{(3)}=4,$$

$$b_{(4)}=4<s_{(4)}=5,$$

$$p_0=(b_{(4)}+s_{(4)})/2=(4+5)/2=4.5,$$

$$s_{(3)}=4<p_0=4.5<b_{(3)}=7,$$

the case (a) of the protocol is applied, and buyers/sellers from (1) to (3) trade at the price $p_0=4.5$. On the other hand, if one of the sellers from (1) to (3) submits a false-name bid 4.8 pretending to be a potential buyer, the declared evaluation values become as follows.

Buyers' evaluation values: 9>8>7>4.8>4
Sellers' evaluation values: 2<3<4<5

In this instance, $b_{(3)}=7>s_{(3)}=4$ and $b_{(4)}=4.8<s_{(4)}=5$ hold, and the buyers/sellers from (1) to (3) trade as in the above case, but $p_0=(b_{(4)}+s_{(4)})/2=(4.8+5)/2=4.9$, and since $b_{(3)}=7>p_0=4.9>s_{(3)}=4$ holds, the trading price becomes $p_0$ and the seller gets 4.9. That is, the seller can increase his or her utility by 0.4 by submitting a false-name bid pretending to be a potential buyer. Thus, the PMD protocol is not robust against false-name bids.

EXAMPLE 2

Assume that evaluation values of buyers/sellers are as follows.

Buyers' evaluation values: 9>8>7>4
Sellers' evaluation values: 2<3<4<12

If each participant truthfully declares his/her evaluation value:

$$b_{(3)}=7>s_{(3)}=4,$$

$$b_{(4)}=4<s_{(4)}=12,$$

$$p_0=(b_{(4)}+s_{(4)})/2=(4+12)/2=8,$$

$s_{(3)}<p_0<b_{(3)}$ does not hold. In this case, the case (b) of the protocol is applied, and buyers/sellers from (1) to (2) trade; the buyers (1) and (2) pays $b_{(3)}=7$, and the sellers (1) and (2) get $s_{(3)}=4$.

EXAMPLE 3

In Example 2, the seller (3) can declare an evaluation value 6 pretending to be another potential seller. As result, Buyers' evaluation values: 9>8>7>4
Sellers' evaluation values: 2<3<4<6<12

In this case, $$b_{(3)}=7>s_{(3)}=4,$$

$$b_{(4)}=4<s_{(4)}=6,$$

$$p_0=(b_{(4)}+s_{(4)})/2=(4+6)/2=5,$$

$$s_{(3)}=4<p_0=5<b_{(3)}=7,$$

and the case (a) of the protocol is applied; buyers/sellers from 1) to (3) trade at the trading price $p_0=5$. If the seller (3) truthfully declares his/her evaluation value, he/she cannot trade and his/her utility is 0. On the other hand, if he/she submits a false-name bid as in Example 2, he/she succeeds in trading, and further, the trading price is higher than desired by 5−4=1; that is, his/her utility can be increased accordingly.

SUMMARY OF THE INVENTION

It is therefore an object of the present invention to provide a winning or successful bid determining scheme that guarantees the incentive compatibility even if false-name bidding is possible, a network auction scheme using the successful bid determining scheme, an auctioneer apparatus therefor, and a recording medium on which there are recorded computer programs for implementing the schemes.

The successful bid decision method in the auctioneer apparatus of an electronic double auction scheme according to the present invention comprises the steps of:

(a) reading out buyers' evaluation values and sellers' evaluation values from a storage part in which evaluation values submitted by buyers and sellers are prestored, sorting said read-out buyers' evaluation values in decreasing order to obtain a sequence of buyers' evaluation values, and sorting said read-out sellers' evaluation values in increasing order to obtain a sequence of sellers' evaluation values;

(b) determining the ranking i of the smallest evaluation value equal to or larger than an auctioneer's determined threshold price in said buyers' evaluation value sequence and the ranking j of the largest evaluation value equal to or smaller than said threshold price in said sellers' evaluation value sequence;

(c) deciding which of said ranking i and j is higher than the other;

(d) determining said threshold price as a trading price for first to i-th buyers and sellers when it is decided in said step (c) that said ranking i and j are equal;

(e) determining a (j+1)-th seller's evaluation value as a trading price for first to j-th buyers and said threshold price for first to j-th sellers when it is decided in said step (c) that said ranking i is higher than j; and (f) determining said threshold price as a trading price for said first to i-th buyers and an (i+1)-th evaluation value as a trading price for said first to i-th sellers when it is decided in step (c) that said ranking i is lower than j.

In the case where sellers and buyers are allowed to bid their desired evaluation values multiple units, the steps (e) and (f) of the above method may be replaced with the steps of:

(e) determining, when it is decided in said step (c) that said ranking i is higher than j, $$\sum_{h=j-k+1}^{j} \max(b_{(h)}^{-x}, r)$$

as a purchase price of k units for a buyer whose k declared evaluation value are contained in first to j-th evaluation values of said buyers' evaluation value sequence, and said threshold price r as a trading price for the first to j-th sellers, said max(b, r) representing the value of the larger one of said b and r, and said $b_{(h)}^{-x}$ representing the h-th largest evaluation value except the evaluation value of a buyer x; and (f) determining, when it is decided in said step (c) that said ranking i is lower than j, said threshold price r as a trading price for the first to i-th buyers, and $$\sum_{h=i-k+1}^{i} \min(s_{(h)}^{\sim y}, r)$$

as a trading price for first to i-th sellers each selling k units, said min(s, r) representing the value of the smaller one of said s and r, and $s_{(h)}^{\sim y}$ representing the h-th smallest evaluation value except the evaluation value of a seller y.

The network auction scheme according to the present invention comprising the steps of:

(A) receiving from sellers and buyers their applications for bidding containing evaluation values;

(B) storing in a storage part said buyers and said sellers in correspondence with their evaluation values upon receiving said application for bidding;

(C) making a check to see if a deadline for application has come;

(D) determining said trade by the method of claim 1 or 2 when said deadline for application has come; and (E) sending a successful-bid notification containing the determined trading price to a buyer apparatus of each buyer determined to be a successful bidder and a seller apparatus of each seller determined to be a successful bidder, and sending an unsuccessful-bid to a buyer apparatus of each buyer determined to be an unsuccessful bidder and a seller apparatus of each seller determined to be an unsuccessful bidder.

The auctioneer apparatus for an electronic double auction scheme according to the present invention comprises:

a communication device capable of communication with buyer apparatuses and seller apparatuses via a network;

a storage part in which applications for bidding each containing an evaluation value, received by said communication device from said buyer apparatuses and said seller apparatuses, are stored with buyers and sellers held in correspondence with said evaluation values;

a threshold price storage part having prestored therein a threshold price r predetermined by an auctioneer;

an evaluation value sequence generating part which reads out said evaluation values of said buyers from said storage part and sorts said read-out evaluation values in a decreasing order to obtain a buyers' evaluation value sequence and which reads out said evaluation values of said sellers from said storage part and sorts said read-out evaluation values in increasing order t obtain a sellers' evaluation value sequence;

a ranking determining part which determines the ranking i of the smallest evaluation value equal to or larger than said threshold price in said buyers' evaluation value sequence and the ranking j of the largest evaluation value equal to or smaller than said threshold price in said sellers' evaluation value sequence;

a decision part for deciding which of said ranking i and j is higher than the other;

a trade determining part which: determines said threshold price as a trading price for first to i-th buyers and sellers when it is decided by said decision part that said ranking i and j are equal; determines a (j+1)-th buyer's evaluation value as a trading price for first to i-th buyers and said threshold price as a trading price for first to j-th sellers when it is decided by said decision part that said ranking i is higher than j; and determines said threshold price as a trading price for first to i-th buyers and an (i+1)th seller's evaluation value as a trading price for said first to i-th sellers when it is decided by said decision part that said ranking i is lower than j; and a bidding results notification generating part which is supplied with information on the trades determined by said trade determining part, generates bidding results notifications, and sends said notifications via said communication device to the corresponding buyer and seller apparatuses.

DETAILED DESCRIPTION OF THE PREFERRED EMBODIMENTS

Principles of the Invention

According to the present invention, in the trading of an article by the two-sided electronic auction the auctioneer sets a threshold price (which is the lowest possible selling price and, at the same time, the highest possible purchase price) r, and controls the number of trades and the trading price through utilization of the threshold price. The method of the present invention will hereinafter be referred to as a TPD protocol (Threshold Price Double Auction Protocol). The principles of the present invention will be described below.

In the first place, the auctioneer sets the threshold price r. Then, each buyer/seller declares his/her evaluation value. Assume that the declared evaluation values are as follows:

Buyers' declared evaluation values: $b_{(1)} \geq b_{(2)} \geq \ldots \geq b_{(i)} \geq r > b_{(i+1)}, \ldots$ Sellers' declared evaluation values: $s_{(1)} \leq s_{(2)} \leq \ldots \leq s_{(j)} \leq r < s_{(j+1)}, \ldots$ The TPD protocol is described as follows:

(a) When i=j, the (1)-st to (i)-th buyers and sellers trade at the price r.

(b) When i>j, the (1)-st to (j)-th buyers and sellers trade. Each buyer pays $b_{(j+1)}$, and each seller receives r. The auctioneer gets the amount of $j \cdot (b_{(j+1)} - r)$.

(c) When i<j, the (1)-st to (i)-th buyers and sellers trade. Each buyer pays r, and each seller $s_{(i+1)}$. The auctioneer gets the amount of $i(r - s_{(i+1)})$.

Under the above-mentioned condition (b) that i>j, it holds $b_{(j+1)} \geq b_{(i)}$ since $i \geq j+1$. Accordingly, $(b_{(j+1)} - r) \geq (b_{(i)} - r) \geq 0$ holds. Similarly, under the condition (c) that i<j, it holds $s_{(i+1)} \leq s_{(j)}$ since $i+1 \leq j$. Accordingly, $(r - s_{(i+1)}) \geq r - s_{(i+1)}) \leq r - s_{(j)} \geq 0$ holds.

It will be proved below that the method of the present invention satisfies incentive compatibility. Since the buyers and the sellers are symmetrical, the following description will be given to prove that this invention method satisfies the incentive compatibility for the buyer. It is can similarly be proved that, for each buyer, the declaration of his or her true evaluation value satisfies the incentive compatibility.

First, the following lemma will be proved.

Lemma 1: In the TPD protocol, when any buyer submits only one bid, his or her utility is the same as or larger than in the case where he or she submits false-name bids, pretending to be potential buyers.

The proof is as follows. Assume that a buyer x uses two identifiers x', x" and declares evaluation values be $b_{x'}$, $b_{x''}$ (assume $b_{x'} \geq b_{x''}$). Now, it will be proved that the utility of the buyer x remains unchanged or increase if he or she refrains from submitting the bid $b_{x''}$ and submits only one bid $b_{x'}$.

The purchase price for the buyers is the threshold price r under either one of the conditions (a) and (c) of the protocol, and the (j+1)-th highest buyers' evaluation value under the condition (b). In either case, the purchase price for the buyers remains unchanged or decreases if the buyer x does not submit the bid $b_{x''}$.

Proof will be given below for each of the numbers of units of goods that the buyer x obtains when he or she uses the two identifiers.

(i) Where the buyer x obtains two units of goods by false-name bidding: Since it is assumed that the demand of each buyer is one unit, he/she buys one additional unit; therefore, it is evident that his or her utility increases by refraining from submitting the bid $b_{x''}$.

(ii) Where the buyer x obtains one unit of goods by false-name bidding: Even if the buyer x refrains from submitting the bid $b_{x''}$, he/she still obtains one unit of goods since $b_{x''} \geq b_{x''}$. If the purchase price is r, the payment is the same as in the case of refraining from submission of the bid $b_{x''}$. In the case where the purchase price is $b_{(j+1)}$, if $b_{x'} = b_{(j+1)}$, the payment becomes larger than or equal to that in the case of refraining from submitting $b_{x''}$ since $b_{(j+1)} \geq b_{(j+2)}$. Accordingly, the buyer's utility remains unchanged or increases in the case of refraining from submitting the bid $b_{x''}$.

Strictly speaking, it is necessary to consider the case of random tie-breaking, in which case, however, the utility of the relevant buyer is 0 even if he or she obtains one unit. Therefore, he or she is indifferent to whether to obtain one unit or not.

(iii) Where the buyer x does not obtain a unit by false-name bidding: Even if the buyer x refrains from submitting the bid $b_{x''}$, he or she cannot obtain a unit, and his/her utility remain 0.

The above proves that when a buyer submits only one bid, his or her utility is the same as or larger than in the case of submitting two or more false-name bids. Similarly, it is shown that even if the buyer submits three or more false-name bids, his or her utility is the same as or smaller than in the case of submitting only one bid.

Next, the following lemma will be proved.

Lemma 2: In the TPD protocol, when a buyer submits false-name bid pretending to be a seller, the number of trades/the purchase price changes only when the false-name bid by the buyer pretending to be a seller is included in actual trades.

The proof is as follows. If no false-name bid is submitted, the number of trades/the purchase price changes with an increase in the number of bids by sellers only when i>j in this protocol. It is obvious that when i≦j (i.e., when the number of bids by sellers whose evaluation values are equal to or smaller than the threshold price is equal to or greater than the number of bids by buyers whose evaluation values are equal to or larger than the threshold price), the addition of a new bid by a seller changes neither of the number of trades and the purchase price. On the other hand, assume that the buyer x submits a bid $s_y$ under a false name y pretending to be a potential seller when i>j. In this instance, it is evident that the number of trades and the purchase price do not change unless $s_y \leq r$. However, if $s_y \leq r$, the bid $s_y$ will be included in the actual trades.

In reality, the buyer x does not have a unit of goods; hence, if the bid $s_y$ is included in the actual trades, the false-name bidding by the buyer x will be brought to light. If a sufficiently large amount of penalty is imposed to false-name bidding, the buyer's utility remains unchanged or increases unless he or she commits such false-name bidding.

From the seller's viewpoint, a seller can submit a false-name bid pretending to be a potential buyer, and can buy a unit if the false-name bid is included in the actual trades; therefore, the false-name bidding will not be found out. In this instance, however, since the seller sells one unit and buys one unit, the selling price is always equal to or lower than the purchase price; hence, the seller cannot obtain a positive utility.

From lemmas 1 and 2, the following lemma is derived.

Lemma 3: If a sufficiently large amount of penalty is imposed to false-name bidding when it is found out, the buyer's utility remains unchanged or increases when submitting only one bid instead of submitting false-name bids.

Lemma 3 indicates that the buyer's utility remains unchanged or increases when the buyer submits only one bid in his or her name. Next, the following lemma will be proved.

Lemma 4: When the buyer submits only one bid in his or her name, declaration of his or her true evaluation value will maximize his or her utility.

Let the true evaluation value by the buyer x be represented by $b_{xt}$. When $b_{xt} < r$, the purchase price will never be less than r—this indicates that over-reporting is useless. When $b_{xt} \geq r$ and the buyer x can obtain a unit by truthfully declaring his or her evaluation value, over-/under-reporting does not affect the purchase price as long as the buyer x obtains one unit; hence, over-/under-reporting is of no use in this case. When $b_{xt} \geq r$ and the buyer x cannot obtain a unit despite truthfully declaration of his or her evaluation value, the condition (b) of the protocol holds and the purchase price is $b_{(j+1)}$. In this instance, since $b_{(j+1)} \geq b_{xt}$, over-reporting will not make the purchase price lower than $b_{(j+1)}$; hence, the buyer x cannot obtain a positive utility. The above suggests that the declaration of a true evaluation is a dominant strategy for buyers.

From the above lemmas, it can be seen that if a sufficiently large amount of penalty is imposed on a discovered false-name bidder, the buyer's utility is maximized by declaring his or her true evaluation value instead of false-name bidding.

The lemmas indicate that the present invention guarantees the incentive compatibility.

EMBODIMENTS

Embodiments of the present invention will be described below. The network auction system to which the present invention is applied is similar in configuration to the prior art example depicted in FIG. 1. In the network system, the sellers send to the auctioneer apparatus 12 via the seller apparatuses 1-1, . . . , 1-n their applications for bidding that contain the lowest possible evaluation values, and the buyers similarly send to the auctioneer apparatus 12 via the buyer apparatuses 2-1, . . . , 2-m their applications for bidding that contain the highest possible evaluation values.

Figure 3:
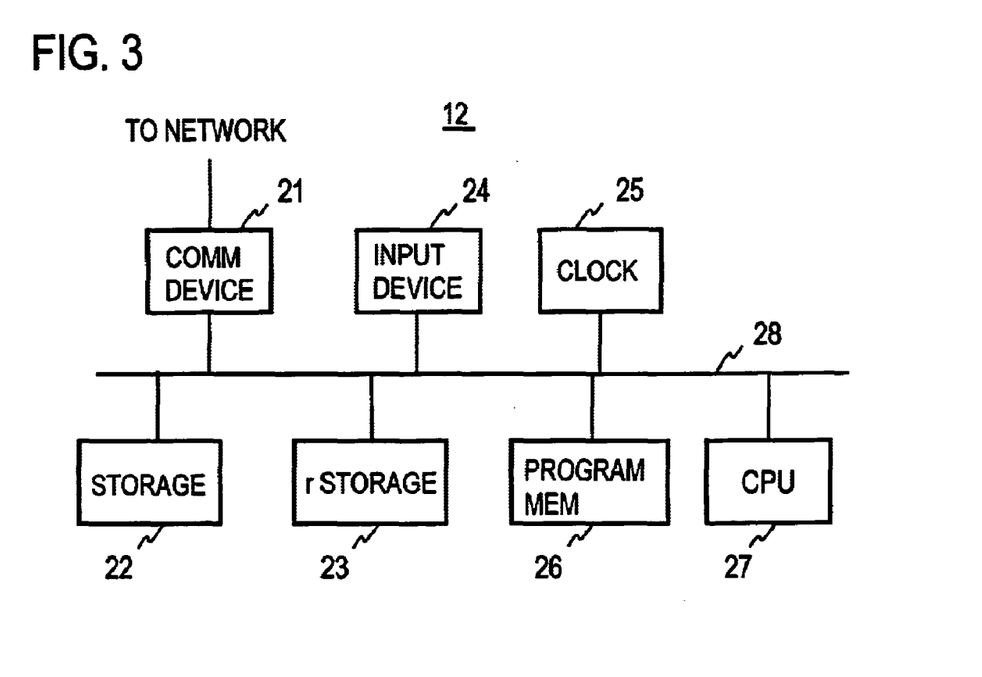
FIG. 3 is a block diagram illustrating an example of an auctioneer apparatus according to the present invention.

The auctioneer apparatus 12 can be operated, for example, by executing computer programs. As depicted in FIG. 3, a communication device 21 for communicating with the seller apparatuses 1-1, . . . , 1-n and the buyer apparatuses 2-1, . . . , 2-m via the communication network 11 in FIG. 1, a storage part 22, a threshold value storage part 23, an input device 24 like a keyboard, a clock 25, a memory 26 having stored therein programs, and a CPU 27 are connected to a bus 28. The CPU 27 executes the programs read out of the memory 26 to operate the auctioneer apparatus 12. The auctioneer pre-stores the threshold value r in the threshold value storage part 23 via the input device 24. The threshold value r may be an arbitrary value, but it is determined by predicting a value that maximizes the number of successful trades. For example, in stock and foreign exchange markets, the threshold value is determined by conducting predictive calculations taking into account variations in trading prices prior to the setting of the threshold value. It is also possible to simply determine the threshold value from turnover in competitive bidding done by the auctioneer so far.

Figure 4:
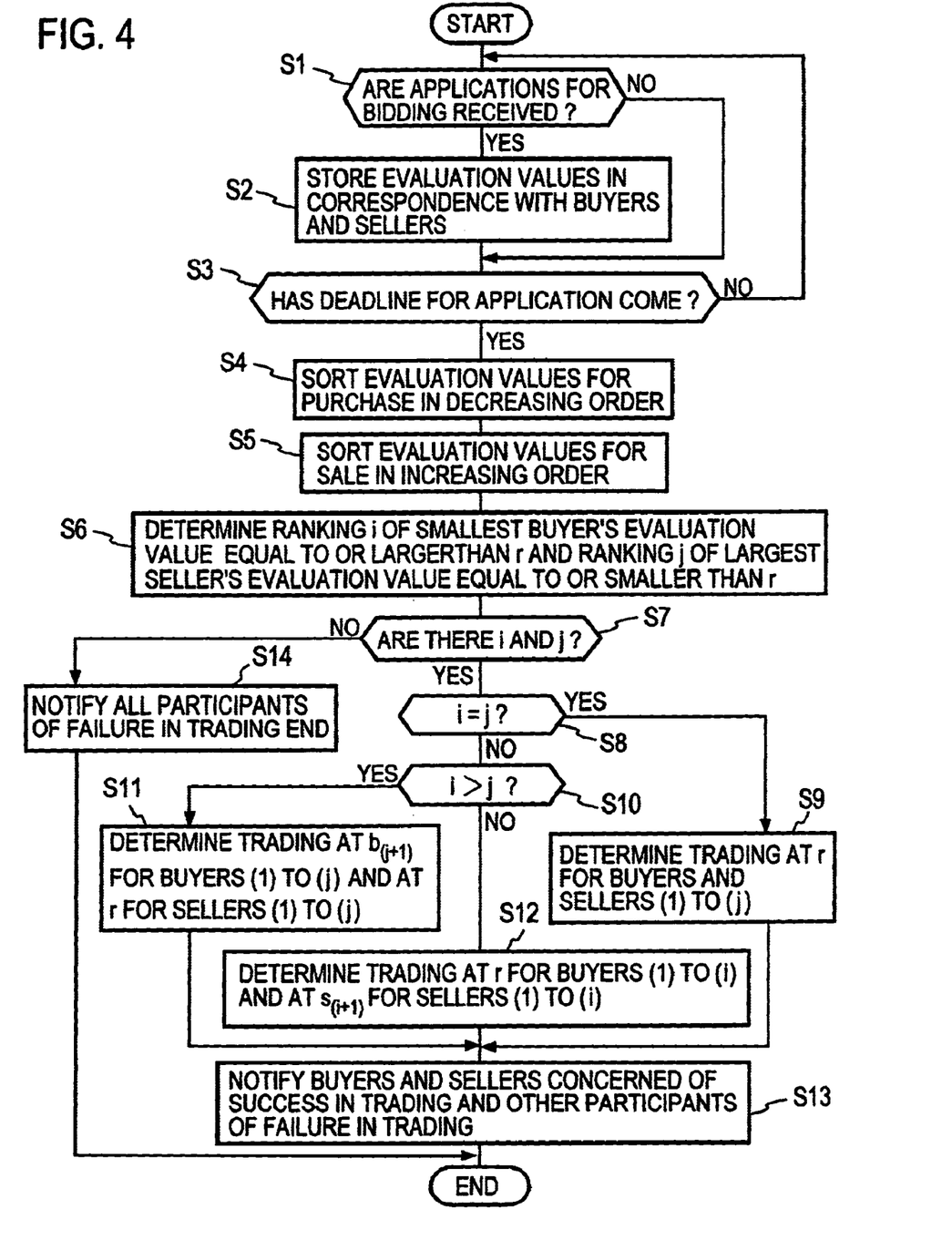
FIG. 4 is a flowchart for the procedure of the auctioneer apparatus based on the TPD protocol according to the present invention.

The auctioneer apparatus 12 follows such a procedure as depicted in FIG. 4. Steps S1 through S5 in FIG. 4 are common to steps S1 through S5 in FIG. 2. Upon receiving an application for bidding (step S1), the auctioneer apparatus 12 stores the buyer or seller of the application and his or her evaluation value n pair form in the storage part 22 (step S2), and receives applications for bidding until the deadline. On the deadline having passed (step S3) the auctioneer apparatus 12 reads out the buyers' evaluation values from the storage part 22, then sorts and re-stores them in the storage part 22 in decreasing order (step S4), and reads out the sellers' evaluation values from the storage part 22 and sort and re-stores them in the storage part 22 in increasing order (step S5).

In this embodiment, the auctioneer apparatus 12 reads out the buyers' evaluation values and the sellers' evaluation values from the storage part 22, and reads out the threshold value r from the storage part 23, then determines the ranking i of the smallest buyer's evaluation value $b_{(i)}$ equal to or larger than r and the ranking j of the largest seller's evaluation value $s_{(j)}$ equal to or smaller than r (step S6). That is, the following relations are calculated.

$$b_{(1)} \geq b_{(2)} \geq \ldots \geq b_{(i)} \geq r > b_{(i+1)} \ldots \quad (1)$$

$$s_{(1)} \leq s_{(2)} \leq \ldots \leq s_{(j)} \leq r < s_{(j+1)} \ldots \quad (2)$$

Next, the auctioneer apparatus 12 makes a check to see if the ranking i and the ranking j determined in step S6 are present (step S7). If they are both present, the auctioneer apparatus 12 decides whether i=j (step S8), and if i=j, then it determines the trading price r for the buyers and sellers corresponding to the first to (i=j)-th evaluation values (step S9).

If i≠j in step S8, the auctioneer apparatus 12 makes a check to see if i>j (step S10), and if so, it determines a trading price $b_{(j+1)}$ for each of the first to j-th buyers and the trading price r for each of the first to j-th sellers (step S11). Since i≧j+1 the value of the trading price $b_{(j+1)}$ satisfies $b_{(j+1)} \geq_{(i)} \geq r$. If i is not larger than j in sep S10, that is, if i<j, the auctioneer apparatus 12 determines the trading price r for each of the first to i-th buyers and the trading price $s_{(i+1)}$ for each of the first to i-th sellers (step S12). Since i+1≦j, the trading price $s_{(i+1)}$ satisfies $s_{(i+1)} \leq s_{(j)} \leq r$.

The buyers and the trading price (purchase price) therefor and the sellers and the trading price (selling price) therefor, determined in step S9, S11, or S12, are sent from the auctioneer apparatus 12, as successful-bid notifications, to the buyer and seller apparatuses concerned, and unsuccessful-bid notifications are sent to the other remaining buyer and seller apparatuses (step S13). When at least one of i and j is absent in step S7, unsuccessful-bid notifications are sent to all the buyer and seller apparatuses (step S14).

Figure 5:
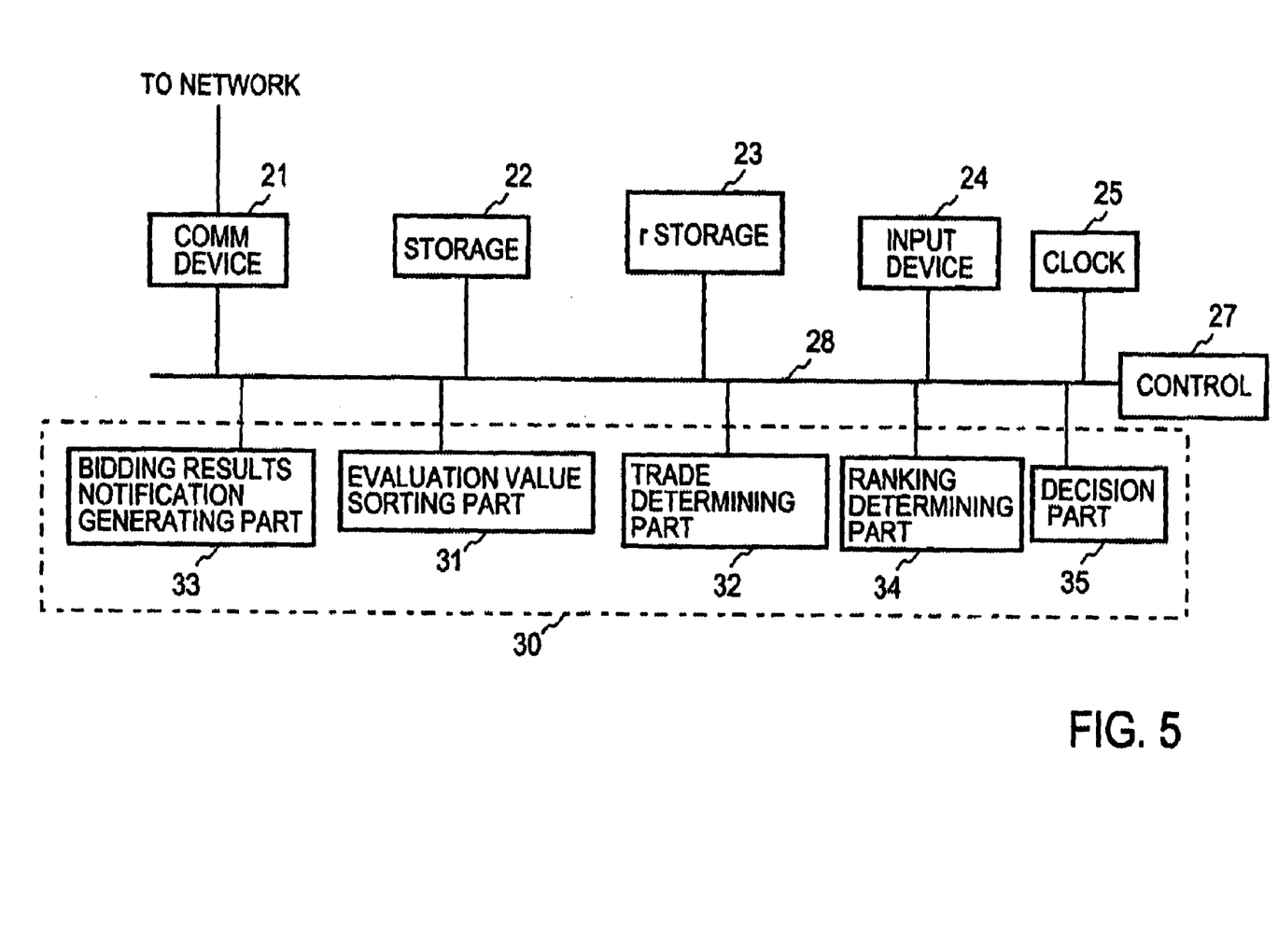
FIG. 5 is a block diagram illustrating the functional configuration of another embodiment of the auctioneer apparatus according to the present invention.

The auctioneer apparatus 12 has such a functional configuration as shown in FIG. 5. That is, the auctioneer apparatus 12 comprises: the communication device 21; the storage part 22; the threshold value storage part 23; the input device 24; the clock 25; the control part 27; an evaluation value sorting part 31 for sorting evaluation values in decreasing order and in increasing order; a ranking determining part 34 for determining the ranking i of the lowest buyer's evaluation value above the threshold value r and the ranking j of the highest seller's evaluation value below r; a decision part 35 for deciding which of the ranking i and j is higher than the other; a trade determining part 32 for determining the buyer and seller qualified to trade and the trading price for each of them; and a bidding results notification generating part 33 for generating bidding result notifications, that is, successful-bid notifications and unsuccessful-bid notifications. These constituent parts are interconnected via a common bus 28.

The applications for bidding received by the communication device 21 are stored in the storage part 22. On the deadline for application having passed, the evaluation value sorting part 31 reads out the evaluation values from the storage part 22, and sorts the buyers' evaluation values in decreasing order and the sellers' evaluation values in increasing order to generate a buyers' evaluation value sequence and a sellers' evaluation value sequence. The ranking determining part 34 determines from these evaluation value sequences and the threshold price r the ranking i of the smallest buyer's evaluation value equal to or larger than the threshold price r and the ranking j of the largest seller's evaluation value equal to or smaller than the threshold price r. The decision part 35 decides which of the ranking i and j is higher. Based on the relationship between the ranking i and j decided by the decision part 35, the trade determining part 32 determines the trades in steps S9, S11 and S12 in FIG. 4. The bidding results notification generating part 33 generates successful- and unsuccessful-bid notifications, which are sent by the communication device 21 to the corresponding buyer and seller apparatuses. The control part 27 controls the above-mentioned processing of the respective parts and the data transfer between them.

In the case of implementing the auctioneer apparatus of FIG. 5, the evaluation value sorting part 31, the trade determining part 32, the bidding results generating part 33, the ranking determining part 34 and the decision part 35 are pre-recorded on the recording medium 30 as a sequence of programs for executing their processing, and the control part 27 controls the execution of the programs.

Next, a description will be given of a concrete example of the present invention that solves the problem of the prior art.

Example 4

Assume that the evaluation values are identical to those in Example 2 as given below.

Buyers' evaluation values: 9>8>7>4
Sellers' evaluation values: 2<3<4<5

Further, assume that the threshold value r is 4.5. In this case, $b_{(i)}=b_{(3)}=7$ and $s_{(j)}=s_{(3)}=5$. The condition (a) of the protocol holds, and the buyers and sellers from (1) to (3) trade at the price r=4.5.

As is the case with Example 1, if any one of the sellers (1) to (3) submits a false-name bid 4.8 pretending to be a potential buyer, the evaluation value sequences are such as given below.

Buyers' evaluation values: 9>8>7>4.8>4
Sellers' evaluation values: 2<3<4<5

In this case, $b_{(i)}=b_{(4)}=4.8$ and $s_{(j)}=s_{(3)}=4$. Since i=4>j=3, the condition (b) of the protocol holds, and the buyers and sellers from (1) to (j=3) trade at a price $b_{(j+1)}=b_{(4)}=4.8$ for the buyers and at the price r=4.5 for the sellers. The purchase price for the buyers increases, but the selling price for the seller remains at the threshold price 4.5. Hence, it is of no use for the seller to pretend to be a potential buyer.

Example 5

As is the case with Example 2, assume that the evaluation values are such as given below.

Buyers' evaluation values: 9>8>7>4
Sellers' evaluation values: 2<3<4<12

If the threshold value r is 6, then the condition (a) of the protocol holds and the buyers and sellers from (1) to (3) trade at the price r=6.

If the seller (3) declares an evaluation value 6 pretending to be another potential seller, the evaluation value sequences are such as given below.

Buyers' evaluation values: 9>8>7>4
Sellers' evaluation values: 2<3<4<6<12

In this case, $b_{(i)}=b_{(3)}=7$ and $s_{(j)}=s_{(4)}=6$. Since i=3<j=4, the condition (c) of the protocol holds, and the buyers and sellers from (1) to (3) trade; the buyers pay r=6 and the sellers gets $s_{(j+1)}=s_{(4)}=6$. Accordingly, the seller (3) receives the same price.

On the other hand, if the threshold price r is 7.5, when the seller (3) does not pretend to be another potential seller, $b_{(i)}=b_{(2)}=8$, $s_{(j)}=s_{(3)}=4$, and i=3<j=4. In this instance, the condition (c) of the protocol holds, and the buyers and sellers from (1) to (2) trade; the buyers pay the price r=7.5, and the sellers get $s_{(j+1)}=s_{(3)}=4$.

If the seller (3) declares an evaluation value 6 pretending to be another potential seller, $b_{(i)}=b_{(2)}=8$, and $s_{(j)}=s_{(3)}=6$, and since i=2<j=4, the buyer and sellers from (1) to (2) trade at the same prices as in the case where the seller (3) does not pretends to be another potential seller; therefore, the seller (3) does not profit from such false-name bidding.

The threshold value r in the TPD protocol according to the present invention can be determined by any methods, but it may also be determined as described below with a view to maximizing the social utility.

The auctioneer constructs, based on data obtained so far, a probability model representing how many buyers/sellers participate in such and such auctions. For instance, in a uniform distribution of sellers'/buyers' evaluation values from 0 to 100 (the numbers of any evaluation values are about the same), the numbers of sellers and buyers are each set to, for example, 500 or so.

Candidates or problem instances of possible bidding are created using the above model. One of the candidates is a problem instance in which 500 sellers/buyers of evaluation values from 0 to 100 are generated using a random numbers.

The number of such problem instances is a sufficiently large, for example, 1000. For each candidate thus generated, the threshold price r is changed in appropriate increments, the resulting social surpluses are calculated and the social surpluses of all the candidates for every threshold price r are averaged. The social surplus mentioned herein is the sum of: amounts of money to be received by sellers and the amounts to be paid by buyers, which are determined according to the auction protocol; the amount of money, obtained by adding together, for all successful bidders, the utilities (surpluses) which are differences between the amounts to be received and paid by the seller and buyers and their corresponding evaluation values; and the amount of money to be obtained by the auctioneer. Such a social surplus is calculated for each threshold price r.

Figure 6:
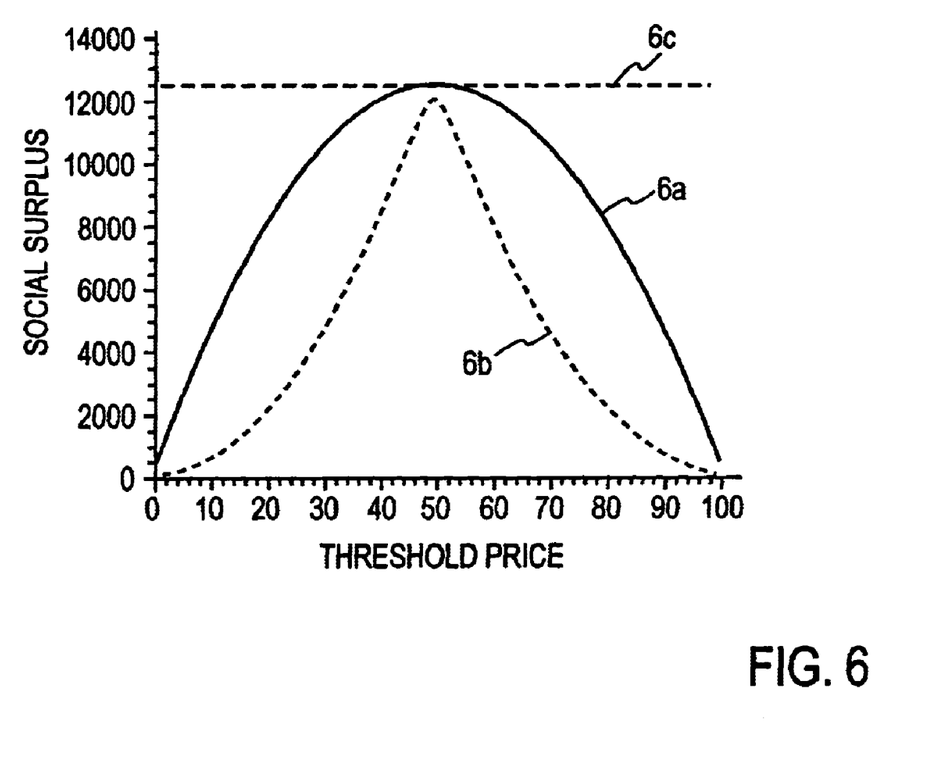
FIG. 6 is a graph for explaining how to decide a threshold price.

FIG. 6 is a graph showing variations in the average social surplus with variations in the threshold price r. In the example of FIG. 6 the curve 6a indicates the average of 1000 social surpluses obtained for each threshold price r by changing the threshold price r in increments of 10 over the evaluation values 0 to 100 for each of the 1000 problem instances. The curve 6b indicates the average of the social surplus except the auctioneer's utility. Further, the maximum value of the social surplus indicated by the curve 6a is indicated by the curve 6c as a Pareto efficient social surplus. Based on FIG. 6, the value of the threshold price r, which maximizes the average social surplus, is set to 50. With the threshold price r determined by such a procedure, it is possible to determine winning bids equitable to all of the sellers, buyers and auctioneer.

While in the above the TPD protocol according to the present invention has been described as being applied to the case where the sellers and buyers each bid for one unit of goods, the protocol can be extended to an auction protocol that enables sellers and buyers to bid their desired evaluation values for multiple units. A description will be given below of the extended TPD protocol. Such an extension is practically important since the demand and supply of foreign currencies, bonds and stocks, which are typical units in double auctions, are mostly multiple units. A decrease in the marginal utility of a unit for every participant can be dealt with a simple extension of the TPD protocol. The marginal utility of a unit means the increase of the participant's utility as a result of obtaining one additional unit. Except, for example, a special case where it is absolutely necessary to obtain 100 stocks, the assumption that the marginal utility decrease is correct.

Let the evaluation values of a buyer x be described by $b_{x,1}$, $b_{x,2}$, $b_{x,3}$, ..., where $b_{x,k}$ represents the marginal utility of a k-th unit for the buyer x. More specifically, $b_{x,k}$ represents the increase of the utility of the buyer x by obtaining one additional unit when he or she already has k−1 units. Under the assumption that the marginal utility decreases, $b_{x,k} \geq b_{x,k+1}$ holds for all x and k. The assumption that the marginal utility decreases seems to be reasonable when trading foreign currencies, bonds, or stocks. Similarly, let the utilities for single units of sellers y be described by $s_{y,1}$, $s_{y,2}$, $s_{y,3}$, ... It must be noted here is that if a seller y has three units to sell, the minimum price at which the seller y is willing to sell the first unit (while keeping the other two units at hand) is represented as $s_{y,3}$ not $s_{y,1}$. Likewise, the minimum price at which the seller y is willing to sell the two units is $s_{y,2}+s_{y,3}$.

Figure 7:
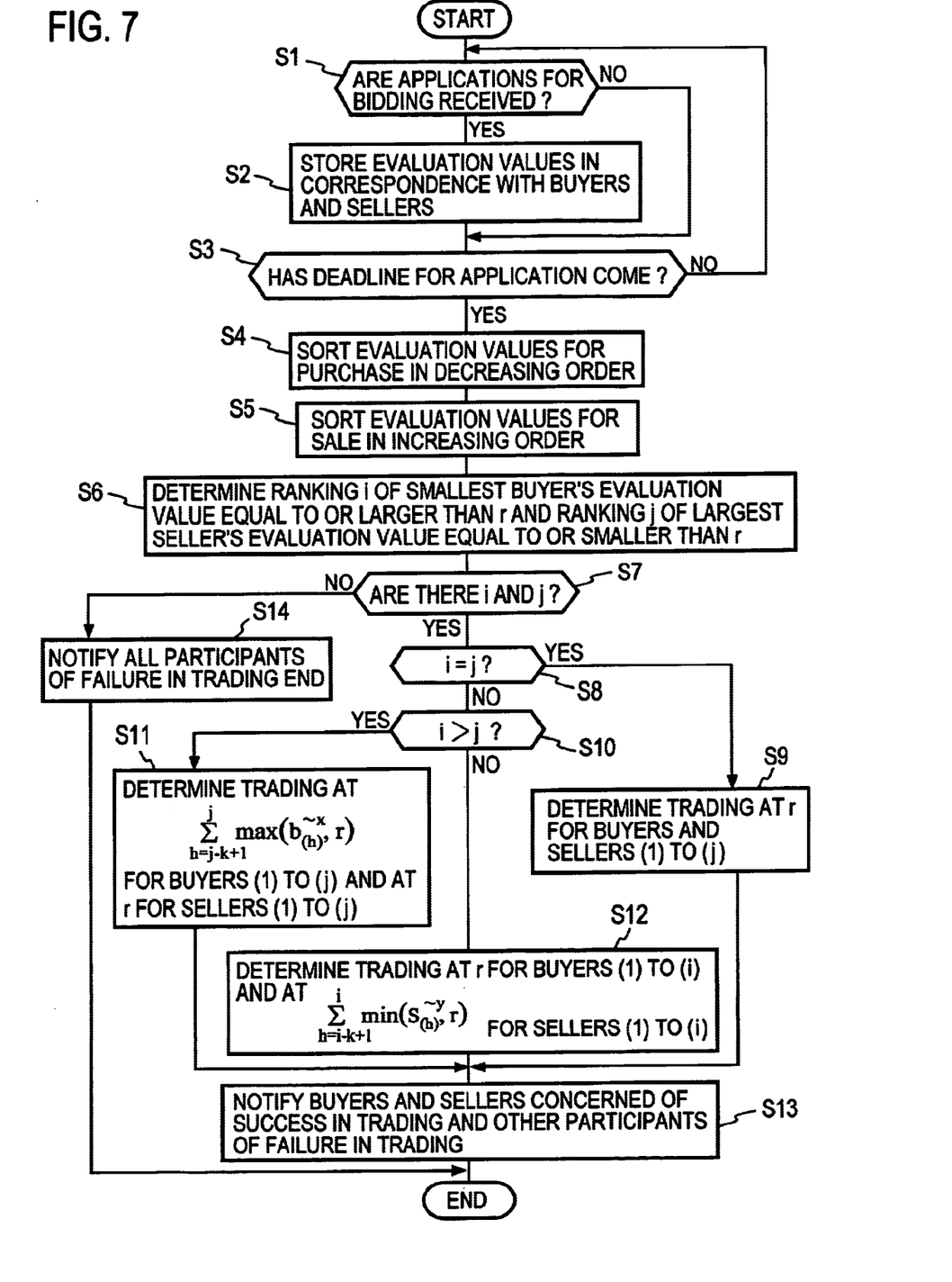
FIG. 7 is a flowchart for the procedure of the auctioneer apparatus based on an extended TPD protocol according to the present invention.

FIG. 7 is a flowchart showing the procedure of the auctioneer apparatus based on the extended TPD protocol that permits bidding for multiple units. Steps S1 to S10, S13 and S14 are exactly the same as the corresponding steps in the FIG. 4 embodiment; hence, only principal steps will be described.

The evaluation values of for each unit by all buyers are sorted in decreasing order as $$b_{(1)} \geq b_{(2)} \geq \ldots \geq b_{(i)} \geq r > b_{(i+1)} \geq \ldots \quad (3)$$

(step S4), and the evaluation values of for each unit by all seller are sorted in increasing order as $$s_{(1)} \leq s_{(2)} \leq \ldots \leq s_{(j)} \leq r \leq s_{(j+1)} \leq \ldots \quad (4)$$

(step S5). Based on these evaluation value sequences (3) and (4), the ranking i of the minimum buyer's evaluation value $b_{(i)}$ equal to or larger than the threshold price r and the ranking j of the maximum seller's evaluation value $s_{(j)}$ equal to or smaller than the threshold price r are determined (step S6).

The protocol is described as follows.

(a) When i=j: The buyers/sellers from (1) to (3) trade at the price r for each unit (step S8, S9).

(b) When i>j: The buyers/sellers from (1) to (i) trade. Each seller gets the selling price r for each unit. A buyer x, whose k declared evaluation values are included in first to j-th values, pays the total of $$\sum_{h=j-k+1}^{j} \max(b_{(h)}^{-x}, r) \qquad (5)$$

(step S10, S11), where max(b, r) represents the value of the larger one of b and r and $b_{(h)}^{-x}$ represents the h-th largest evaluation value except those of the buyer x. The auctioneer gets the difference between the selling price and the purchase price.

(c) i<j: The buyers/sellers from (1) to (i) trade. Each buyer pays the price r for each unit. A seller y who sells k units gets the total of $$\sum_{h=i-k+1}^{i} \min(s_{(h)}^{-y}, r) \qquad (6)$$

(step S12), where min(s, r) represents the value of the smaller one of s and r and $s_{(h)}^{-y}$ represents the h-th smallest evaluation value. The auctioneer gets the difference between the selling price and the purchase price.

An example of the application of the protocol will be described below. Assume that the evaluation values by buyers/sellers are as follows.

Buyers' evaluation values: 9>8>7>6>4
Sellers' evaluation values* 2<3<4<5<7

Further, assume that the threshold price r is 4.5, that the evaluation values 9 and 8 are declared by the same buyer x, and that the other evaluation values are all declared by different sellers/buyers. The second condition of the protocol holds, and the above-mentioned three units are traded. Each seller gets the threshold price r=4.5. The payment of the buyer x who obtains two units is calculated as follows:

$$\sum_{h=3-2+1}^{3} \max(b_{(h)}^{-x}, r) = \max(b_{(2)}^{-x}, 4.5) + \max(b_{(3)}^{-x}, 4.5) \qquad (7)$$

The second highest evaluation value of the buyer x except the evaluation values 9 and 8 is $b_{(2)}^{-x}=6$, and the third highest evaluation value of the buyer x except the evaluation values 9 and 8 is $b_{(3)}^{-x}=4$. Since the former is larger than 4.5, $\max(b_{(2)}^{-x},4.5)=6$. Since the latter is smaller than 4.5, $\max(b_{(3)}^{-x}, 4.5)=4.5$. Accordingly, the payment is 6+4.5=10.5. On the other hand, the payment of the buyer who declares the evaluation value 7 and obtains only one unit is calculated as the third highest evaluation value except 7, i.e., 6.

With the assumption that the marginal utility decreases, if a buyer's evaluation value for the k-th unit is included in the trade, his/her evaluation value for the (k−1)-th unit is also included in the trade. Also, if a seller's evaluation value for the k-th unit is included in the trade, his/her evaluation value for the (k+1)-th unit (if the seller has it) is also included in the trade. On the other hand, if marginal utilities of participants increase, these properties cannot hold, and it is impossible to determine the trades by sorting the participants' evaluation values for each unit as in this protocol.

EFFECT OF THE INVENTION

As described above, according to the present invention, even if a single bidder submits multiple bids under multiple fictitious names, the bidder cannot profit from such false-name bidding, and truthfully declaring correct evaluation values for each unit guarantees maximization of bidders' utility.

What is claimed is:

1. A successful bid decision method in an auctioneer apparatus of an electronic double auction scheme in which buyers and sellers each bid for k units, said k being an integer equal to or greater than 1, said method comprising the steps of:

(a) reading out buyers' evaluation values and sellers' evaluation values from a storage part in which evaluation values b submitted by buyers and evaluation values s submitted by sellers are prestored, sorting said read-out buyers' evaluation values in decreasing order to obtain a sequence of buyers' evaluation values $b_{(1)}, b_{(2)}, \ldots$, and sorting said read-out sellers' evaluation values in increasing order to obtain a sequence of sellers' evaluation values $s_{(1)}, s_{(2)}, \ldots$;

(b) determining a ranking i of a smallest evaluation value $b_{(i)}$ equal to or larger than an auctioneer's determined threshold price r in said buyers' evaluation value sequence and a ranking j of a largest evaluation value $s_{(j)}$ equal to or smaller than said threshold price r in said sellers' evaluation value sequence;

(c) deciding which of said ranking i and j is higher than the other;

(d) determining said threshold price r as a trading price for first to i-th buyers and sellers when it is decided in said step (c) that said ranking i and j are equal;

(e) determining, when it is decided in said step (c) that said ranking i is higher than j, $$\sum_{h=j-k+1}^{j} \max(b_{(h)}^{-x}, r)$$

as a purchase price of k units for a buyer whose k declared evaluation values are contained in first to j-th evaluation values of said buyers' evaluation value sequence, and said threshold price r as a trading price for the first to j-th sellers, said max(b, r) representing a value of larger one of said b and r, and said $b_{(h)}^{-x}$ representing an h-th largest evaluation value except an evaluation value of a buyer x;

(f) determining, when it is decided in said step (c) that said ranking i is lower than j, said threshold price r as a trading price for the first to i-th buyers, and $$\sum_{h=i-k+1}^{i} \min(s_{(h)}^{-y}, r)$$

as a trading price for first to i-th sellers each selling k units, said min(s, r) representing a value of smaller one of said s and r, and $s_{(h)}^{-y}$ representing an h-th smallest evaluation value except an evaluation value of a seller y; and (g) sending a successful-bid notification containing the determined trading price to each buyer determined to be a successful bidder and each seller determined to be a successful bidder.

2. A network auction method in which buyers each send an application for bidding containing a highest evaluation value to an auctioneer apparatus from a buyer apparatus via a communication network, sellers each send an application for bidding containing a lowest evaluation value to said auctioneer apparatus from a seller apparatus via said communication network, and an auctioneer determines a trade via said auctioneer apparatus, said scheme comprising the steps of:

(A) receiving from said sellers and said buyers their applications for bidding containing evaluation values;

(B) storing in a storage part said buyers and said sellers in correspondence with their evaluation values upon receiving said applications for bidding;

(C) making a check to see if a deadline for application has come;

(D) determining said trade by the following steps when said deadline for application has come:

(D-a) reading out buyers' evaluation values and sellers' evaluation values from a storage part in which evaluation values b submitted by buyers and evaluation values s submitted by sellers are prestored, sorting said read-out buyers' evaluation values in decreasing order to obtain a sequence of buyers' evaluation values $b_{(1)}, b_{(2)}, \ldots$, and sorting said read-out sellers' evaluation values in increasing order to obtain a sequence of sellers' evaluation values $s_{(1)}, s_{(2)}, \ldots$;

(D-b) determining a ranking i of a smallest evaluation value $b_{(i)}$ equal to or larger than an auctioneer's determined threshold price r in said buyers' evaluation value sequence and a ranking j of a largest evaluation value $s_{(j)}$ equal to or smaller than said threshold price r in said sellers' evaluation value sequence;

(D-c) deciding which of said ranking i and j is higher than the other;

(D-d) determining said threshold price r as a trading price for first to i-th buyers and sellers when it is decided in said step (D-c) that said ranking i and j are equal;

(D-e) determining, when it is decided in said step (D-c) that said ranking i is higher than j, $$\sum_{h=i-k+1}^{i} \min(s_{(h)}^{\sim y}, r)$$

as a purchase price of k units for a buyer whose k declared evaluation values are contained in first to j-th evaluation values of said buyers' evaluation value sequence, and said threshold price r as a trading price for the first to j-th sellers, said max(b,r) representing a value of larger one of said b and r, and said $b_{(h)}^{\sim x}$ representing an h-th largest evaluation value except an evaluation value of a buyer x, where k is an integer equal to or greater than 1; and (D-f) determining, when it is decided in said step (D-c) that said ranking i is lower than j, aid threshold price r as a trading price for the first to i-th buyers, and $$\sum_{h=i-k+1}^{i} \min(s_{(h)}^{\sim y}, r)$$

as a trading price for first to i-th sellers each selling k units, said min(s,r) representing a value of smaller one of said s and r, and $s_{(h)}^{\sim y}$ representing an h-th smallest evaluation value except an evaluation value of a seller y; and (E) sending a successful-bid notification containing the determined trading price to the buyer apparatus of each buyer determined to be a successful bidder and the seller apparatus of each seller determined to be a successful bidder, and sending an unsuccessful-bid to the buyer apparatus of each buyer determined to be an unsuccessful bidder and the seller apparatus of each seller determined to be an unsuccessful bidder.

3. An auctioneer apparatus for an electronic double auction scheme comprising:

a communication device capable of communication with buyer apparatuses and seller apparatuses via a network;

a storage part in which buyer's evaluation values, sellers' evaluation values and applications for bidding each containing an evaluation value, received by said communication device from said buyer apparatuses and said seller apparatuses, are stored with buyers and sellers held in correspondence with said evaluation values;

a threshold price storage part having prestored therein a threshold price r predetermined by an auctioneer;

an evaluation value sequence generating part which reads out said evaluation values of said buyers from said storage part and sorts said read-out evaluation values in a decreasing order to obtain a buyers' evaluation value sequence $b_{(1)}, b_{(2)}, \ldots$, and which reads out said evaluation values of said sellers from said storage part and sorts said read-out evaluation values in increasing order to obtain a sellers' evaluation value sequence $s_{(1)}, s_{(2)}, \ldots$;

a ranking determining part which determines a ranking i of a smallest evaluation value $b_{(1)}$ equal to or larger than said threshold price r in said buyers' evaluation value sequence and a ranking j of a largest evaluation value $s_{(1)}$ equal to or smaller than said threshold price r in said sellers' evaluation value sequence;

a decision part for deciding which of said ranking i and j is higher than the other;

a trade determining part which: determines said threshold price r as a trading price for first to i-th buyers and sellers when it is decided by said decision part that said ranking i and j are equal; determines $$\sum_{h=i-k+1}^{i} \min(s_{(h)}^{\sim y}, r)$$

as a purchase price of k units for a buyer whose k declared evaluation values are contained in first to j-th evaluation values of said buyer's evaluation value sequence and said threshold price r as a trading price for first to j-th sellers when it is decided by said decision part that said ranking i is higher than j, said max(b,r) representing a value of larger one of said b and r, said $b_{(h)}^{\sim x}$ representing an h-th largest evaluation value except an evaluation value of a buyer x; and determines said threshold price as a trading price for said first to i-th buyers and $$\sum_{h=i-k+1}^{i} \min(s_{(h)}^{\sim y}, r)$$

as a trading price for said first to i-th sellers each selling k units when it is decided by said decision part that said ranking i is lower than j, said min(s,r) representing a value of smaller one of said s and r, and $s_{(h)}^{\sim y}$ representing an h-th smallest evaluation value except an evaluation value of a seller y; and a bidding results notification generating part which is supplied with information on trades determined by said trade determining part, generates bidding results notifications, and sends said notifications via said communication device to the corresponding buyer apparatuses and seller apparatuses.

4. A recording medium on which there are recorded programs for executing by a computer a successful bid decision method in an auctioneer apparatus of an electronic double auction scheme in which buyers and sellers each bid for k units, said k being an integer equal to or greater than 1, said method comprising the steps of:

(a) reading out buyers' evaluation values and sellers' evaluation values from a storage part in which evaluation values b submitted by buyers and evaluation values s submitted by sellers are prestored, sorting said read-out buyers' evaluation values in decreasing order to obtain a sequence of buyers' evaluation values $b_{(1)}, b_{(2)}, \ldots$, and sorting said read-out sellers' evaluation values in increasing order to obtain a sequence of sellers' evaluation values $s_{(1)}, s_{(2)}, \ldots$;

(b) determining a ranking i of a smallest evaluation value $b_{(1)}$ equal to or larger than an auctioneer's determined threshold price r in said buyers' evaluation value sequence and a ranking j of a largest evaluation value $s_{(j)}$ equal to or smaller than said threshold price r in said sellers' evaluation value seciuence;

(c) deciding which of said ranking i and j is higher than the other;

(d) determining said threshold price r as a trading price for first to i-th buyers and sellers when it is decided in said step (c) that said ranking i and j are equal;

(e) determining, when it is decided in said step (c) that said ranking i is higher than j, $$\sum_{h=j-k+1}^{j} \max(b_{(h)}^{\sim x}, r)$$

as a purchase price of k units for a buyer whose k declared evaluation values are contained in first to j-th evaluation values of said buyers' evaluation value sequence, and said threshold price r as a trading price for the first to j-th sellers, said max(b, r) representing a value of larger one of said b and r, and said $b_{(h)}^{\sim x}$ representing an h-th largest evaluation value except an evaluation value of a buyer x;

(f) determining, when it is decided in said step (c) that said ranking i is lower than j, said threshold price r as a trading price for the first to i-th buyers, and $$\sum_{h=i-k+1}^{i} \min(s_{(h)}^{\sim y}, r)$$

as a trading price for first to i-th sellers each selling k units, said min(s, r) representing a value of smaller one of said s and r, and $s_{(h)}^{\sim y}$ representing an h-th smallest evaluation value except an evaluation value of a seller y; and (g) sending a successful-bid notification containing the determined trading price to each buyer determined to be a successful bidder and each seller determined to be a successful bidder.

5. A recording medium on which there are recorded programs for executing by a computer a network auction method in which buyers each send an application for bidding containing a highest evaluation value to an auctioneer apparatus from a buyer apparatus via a communication network, sellers each send an application for bidding containing a lowest evaluation value to said auctioneer apparatus from a seller apparatus via said communication network, and an auctioneer determines a trade via said auctioneer apparatus, said scheme comprising the steps of:

(A) receiving from said sellers and said buyers their applications for bidding containing evaluation values;

(B) storing in a storage part said buyers and said sellers in correspondence with their evaluation values upon receiving said applications for bidding;

(C) making a check to see if a deadline for application has come;

(D) determining said trade by the following steps when said deadline for application has come:

(D-a) reading out buyers' evaluation values and sellers' evaluation values from a storage part in which evaluation values b submitted by buyers and evaluation values s submitted by sellers are prestored, sorting said read-out buyers' evaluation values in decreasing order to obtain a sequence of buyers' evaluation values $b_{(1)}, b_{(2)}, \ldots$, and sorting said read-out sellers' evaluation values in increasing order to obtain a sequence of sellers' evaluation values $s_{(1)}, s_{(2)}, \ldots$;

(D-b) determining a ranking i of a smallest evaluation value $b_{(1)}$ equal to or larger than an auctioneer's determined threshold price r in said buyers' evaluation value sequence and a ranking j of a largest evaluation value $S_{(j)}$ equal to or smaller than said threshold price r in said sellers' evaluation value sequence;

(D-c) deciding which of said ranking i and j is higher than the other;

(D-d) determining said threshold price r as a trading price for first to i-th buyers and sellers when it is decided in said step (D-c) that said ranking i and j are equal;

(D-e) determining, when it is decided in said step (D-c) that said ranking i is higher than j, $$\sum_{h=j-k+1}^{j} \max(b_{(h)}^{\sim x}, r)$$

as a purchase price of k units for a buyer whose k declared evaluation values are contained in first to j-th evaluation values of said buyers' evaluation value sequence, and said threshold price r as a trading price for the first to j-th sellers, said max(b,r) representing a value of larger one of said b and r, and said $b_{(h)}^{-x}$ representing an h-th largest evaluation value except an evaluation value of a buyer x, where k is an integer equal to or greater than 1; and (D-f) determining, when it is decided in said step (D-c) that said ranking i is lower than j, aid threshold price r as a trading price for the first to i-th buyers, and $$\sum_{h=i-k+1}^{i} \min(s_{(h)}^{\sim y}, r)$$

as a trading price for first to i-th sellers each selling k units, said min(s, r) representing a value of smaller one of said sand r, and $s_{(h)}^{-x}$ representing an h-th smallest evaluation value except an evaluation value of a seller y; and (E) sending a successful-bid notification containing the determined trading price to the buyer apparatus of each buyer determined to be a successful bidder and the seller apparatus of each seller determined to be a successful bidder, and sending an unsuccessful- bid to the buyer apparatus of each buyer determined to be an unsuccessful bidder and the seller apparatus of each seller determined to be an unsuccessful bidder.

\* \* \* \* \*